United States Patent [19]

Kobayashi et al.

[11] Patent Number: 4,571,683

[45] Date of Patent: Feb. 18, 1986

[54] LEARNING CONTROL SYSTEM OF AIR-FUEL RATIO IN ELECTRONIC CONTROL ENGINE

[75] Inventors: Nobuyuki Kobayashi, Toyota; Toshiaki Isobe, Nagoya; Nobuhisa Ohkawa; Takahide Kuma, both of Toyota, all of Japan

[73] Assignee: Toyota Jidosha Kogyo Kabushiki Kaisha, Toyota, Japan

[21] Appl. No.: 403,042

[22] Filed: Jul. 29, 1982

[30] Foreign Application Priority Data

Mar. 3, 1982 [JP] Japan .................................. 57-32308

[51] Int. Cl.⁴ ......................... G06F 7/76; G06F 15/48; G06F 15/50; G06G 7/70

[52] U.S. Cl. ................................ 364/431.05; 123/480; 123/488; 123/589; 123/492

[58] Field of Search ............... 123/339, 417, 480, 489, 123/491, 488, 585, 586, 587, 588, 589, 492; 364/431.05, 431.11

[56] References Cited

U.S. PATENT DOCUMENTS

| | | | |
|---|---|---|---|
| 4,235,204 | 11/1980 | Rice | 123/440 |
| 4,276,601 | 6/1981 | Tokuda et al. | 364/431.12 |
| 4,309,971 | 1/1982 | Chiesa et al. | 123/480 |
| 4,319,327 | 3/1982 | Higashiyama et al. | 364/431.05 |
| 4,321,903 | 3/1982 | Kondo et al. | 123/440 |
| 4,348,727 | 9/1982 | Kobayashi et al. | 364/431.06 |
| 4,348,728 | 9/1982 | Sagisaka et al. | 364/431.06 |
| 4,373,187 | 2/1983 | Ishii et al. | 364/431.06 |
| 4,379,332 | 4/1983 | Busser et al. | 123/480 |
| 4,383,515 | 5/1983 | Higashiyama et al. | 123/489 |
| 4,385,596 | 5/1983 | Hosaka | 123/488 |
| 4,408,279 | 10/1983 | Imai et al. | 364/431.05 |
| 4,425,890 | 1/1984 | Yamaguchi | 123/480 |
| 4,445,483 | 5/1984 | Hasegawa | 123/480 |

*Primary Examiner*—John W. Caldwell, Sr.
*Assistant Examiner*—Donna Angotti
*Attorney, Agent, or Firm*—Cushman, Darby & Cushman

[57] ABSTRACT

This system computes final fuel injection amount TAU on the basis of the following formula;

$$TAU = A \times TP + B + J$$

where

A : a first learning term
B : a second learning term
TP : basic fuel injection amount
J : correction amount Learning control is effected by correcting the second learning term B during idling periods and by correcting the first learning term A when an engine has larger than a predetermined load.

7 Claims, 4 Drawing Figures

LEARNING CONTROL SYSTEM OF AIR-FUEL RATIO IN ELECTRONIC CONTROL ENGINE

BACKGROUND OF THE INVENTION

1. Field of the Invention

This invention relates to a learning air-fuel ratio control system for use with an electronic control fuel injection engine, which computes fuel injection amount and the like by means of a digital processor.

2. Description of the Prior Art

In a conventional learning air-fuel ratio control system for an electronic control engine, the final fuel injection amount TAU is defined, for example, as follows;

$$TAU = A \times TP + K1 \quad (1)$$

or $$TAU = K2 \times TP + B \quad (2)$$

where A, B: learning terms

TP: basic fuel injection amount as function F(L) of engine load L

K1, K2: constant or correction amount due to intake air temperature.

With either type of control, only a single learning term is employed. During the learning control, either A in formula (1) or B in formula (2) is corrected in relation to feedback signals from an air-fuel ratio sensor. However, in the formula (1), sufficient learning effect cannot be obtained during idling period, so that the stability of control or purification of exhaust gas is deteriorated. In the formula (2), sufficient learning effect cannot be obtained during running with high load, so that the purification of exhaust gas and the engine running performance (drive ability) are deteriorated.

SUMMARY OF THE INVENTION

An object of the present invention is to provide a learning air-fuel ratio control system for use with an electronic control engine, which can produce excellent stability and responsiveness during a learning period in which values for determining the air-fuel ratio are updated.

To achieve this object, according to the present invention, the final fuel injection amount is defined as TAU. A basic fuel injection amount TP is a predetermined function of engine load. First and second learning terms are referred to as A and B and a correction amount as J. The present invention sets the relationship $TAU = A \times TP + B + J$. Also, air-fuel ratio learning is controlled by correcting the first and second learning terms A and B in relation to feedback signals related to the air-fuel ratio. The second learning term B is corrected during the idling period and the first learning term A is corrected when the engine runs with a predetermined load or more.

Since the required fuel injection amount itself is small during the idling period, a proper air-fuel ratio is maintained as a result of learning correction of the learning term B. Also, since the required fuel injection amount is large during high load periods and the degree of deviation of the fuel injection amount from a median is proportional to the load, a proper air-fuel ratio is maintained as a result of learning correction of the first learning term A as a multiplying term. Thus, the effect of the learning control in the learning control period is improved further.

The determination of whether the learning control is carried out by the correction of the first learning term A or by the second learning term B is made in relation to intake air flow rate, intake pipe vacuum or opening of throttle valve corresponding to the engine load for example.

The correction amount J may be functions of engine running conditions other than load, for example, engine temperature, intake air temperature, etc. Also, the correction amount J may be zero in a special case.

DESCRIPTION OF THE PREFERRED EMBODIMENTS

Embodiments of the present invention will be described hereinafter with reference to the drawings.

Figure 1:
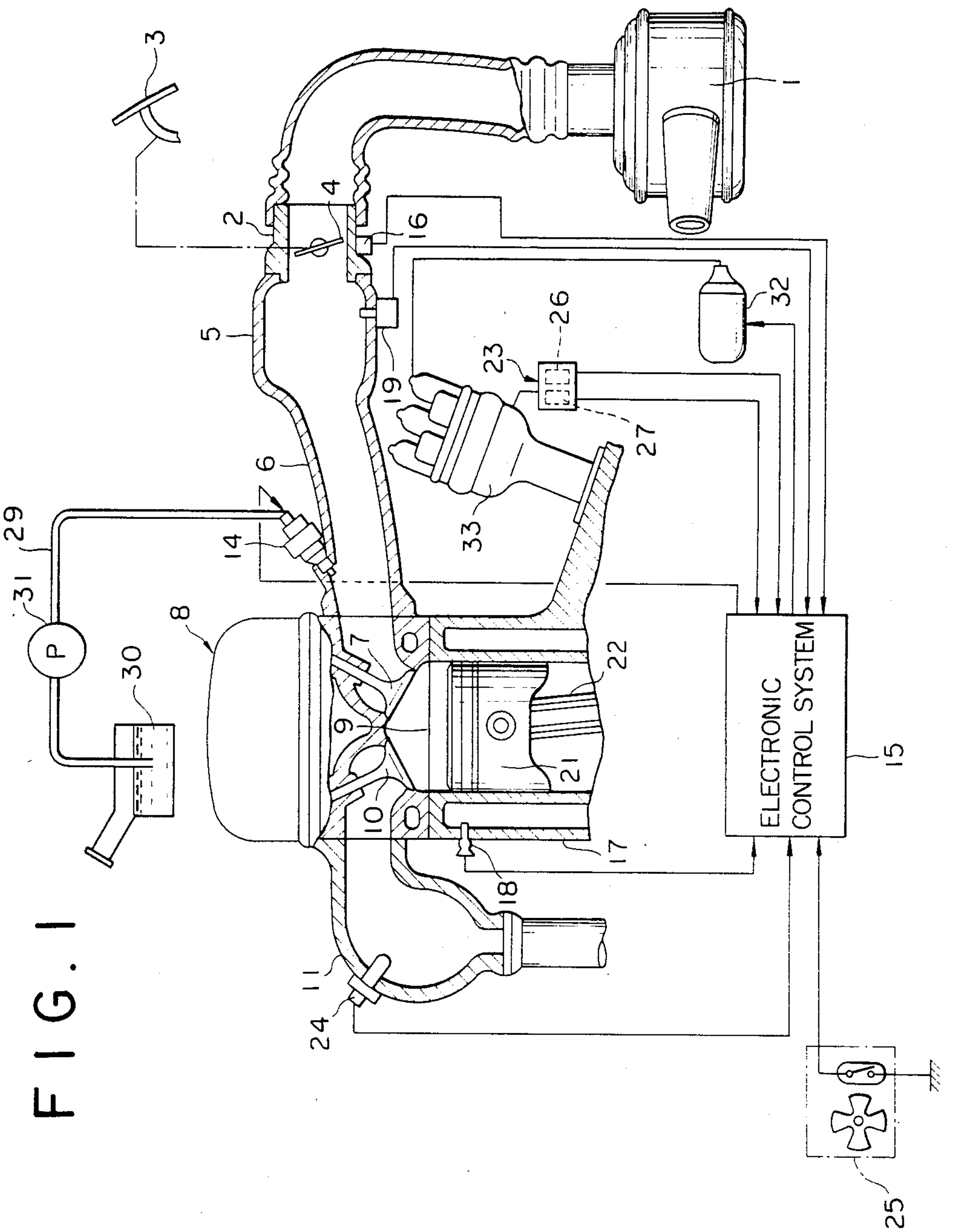
FIG. 1 is a schematic view of an electronic control engine according to the present invention.

Referring generally to the whole electronic control engine according to this invention shown in FIG. 1, air flow sucked from an air cleaner 1 is controlled by a throttle valve 4 provided in a throttle body 2 and interlocked with an accelerator pedal 3 in a cab. The air is then supplied to a combustion chamber 9 in an engine body 8 through a surge tank 5, intake pipe 6 and intake valve 7. Mixture burned in the combustion chamber 9 is discharged as exhaust gas through an exhaust valve 10 and exhaust manifold 11. An electromagnetic system fuel injection valve 14 corresponding to each combustion chamber 9 is provided in the intake pipe 6. An electronic control system 15 receives input signals from a throttle switch 16 for detecting full closing of the throttle valve 4, a water temperature sensor 18 mounted on a water jacket 17 of the engine body 8, a pressure sensor 19 provided in the surge tank 5 to detect intake pipe pressure related to intake air flow rate, a crank angle sensor 23 for detecting rotational angle of a distributor shaft coupled with a crankshaft for detecting rotational angle of the crankshaft coupled with a piston 21 through a connecting rod 22, an air fuel ratio sensor 24 provided in an exhaust manifold 11 for detecting oxygen concentration in the exhaust gas, a vehicle speed sensor 25, etc. The rotational angle sensor 23 is provided with a portion 26 for generating one pulse for two rotations of the crankshaft and another portion 27 for generating a pulse for every predetermined crank angle, for example, 30°. Fuel is forcibly sent from a fuel tank 30 to a fuel injection valve 14 through a fuel path 29 by a fuel pump 31.

The electronic control system 15 computes fuel injection amount and fuel injection time on the basis of various input signals to send fuel injection pulses to the fuel injection valve 14 while computing ignition timing to send signals to an ignition coil 32. Secondary current in the ignition coil 32 is sent to a distributor 33. Further, the injection valve 14 is maintained in the opened condition only when it receives pulses from the electronic control system 15.

Figure 2:
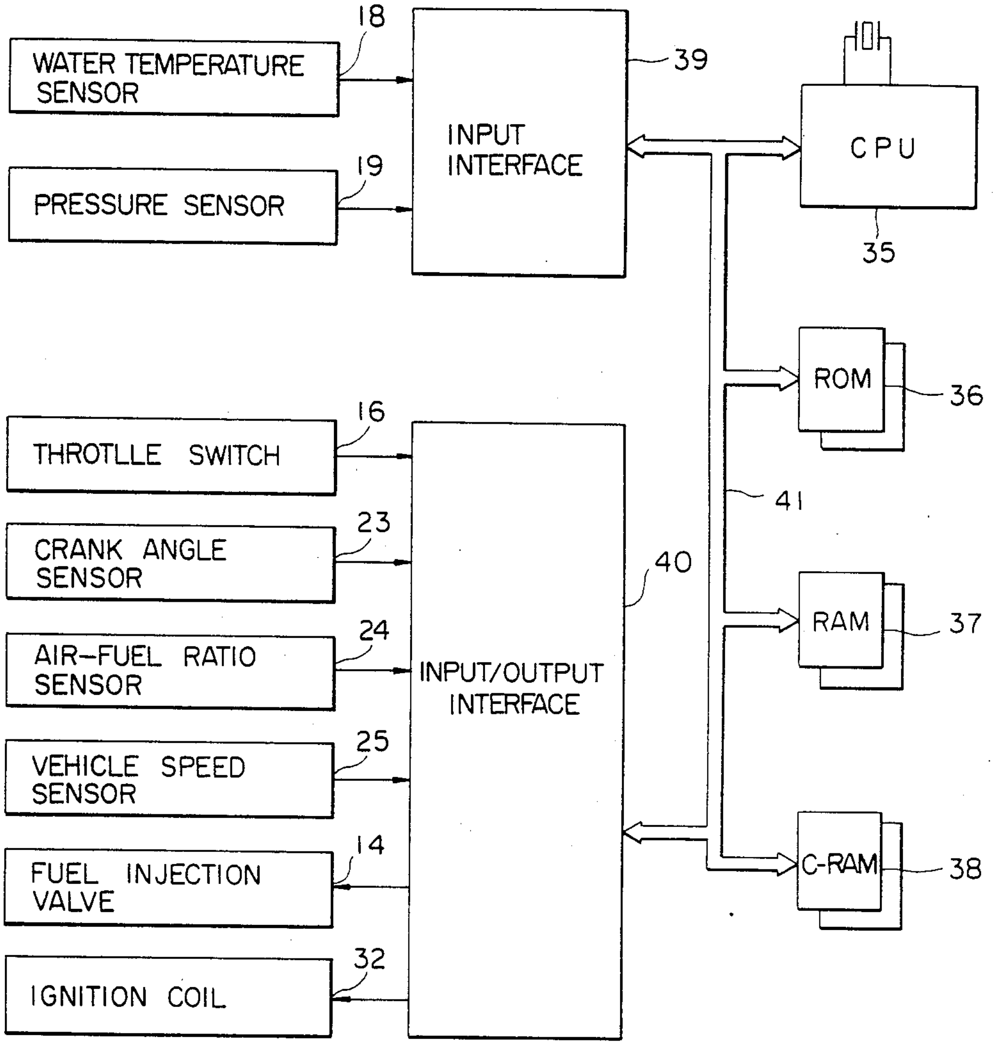
FIG. 2 is a block diagram of the electronic control system in FIG. 1.

FIG. 2 is a block diagram of the interior of the electronic control system 15. CPU (Central Processor Unit) 35 as digital processor, ROM (Read-Only Memory) 36, RAM (Random Access Memory) 37, C-RAM (complementary logic type RAM) 38, input interface 39 and input/output interface 40 are connected to each other through a bus 41. One C-RAM 38 can be supplied with a predetermined power even during stoppage of the engine to keep memory. The input interface 39 has a built-in A/D (Analog/Digital) converter, and the analog outputs of the water temperature sensor 18 and pressure sensor 19 are sent to the input interface 39. The outputs of the throttle switch 16, crank angle sensor 23, air-fuel ratio sensor 24 and vehicle speed sensor 25 are sent to the input/output interface 40, and electric signals are sent from the input/output interface 40 to the fuel injection valve 14 and ignition coil 32.

In this invention, the final fuel injection amount TAU is defined as the following formula;

$$TAU = A \times TP + B + J \quad (3)$$

where

A: a first learning term

B: a second learning term

TP: basic fuel injection amount ($TP=F(L)$) as function F(L) of engine load L

J: correction amount the correction amount J may be zero or a function of engine running condition other than engine load, for example, engine temperature, intake air temperature, etc.

Figure 3:
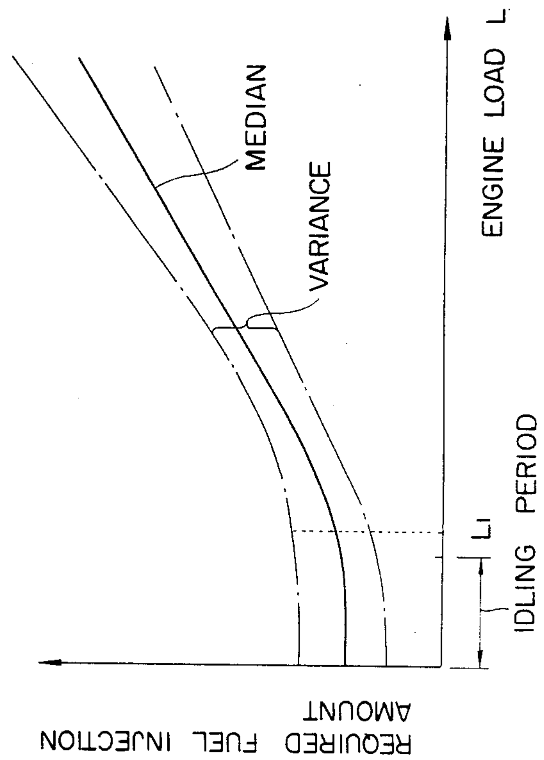
FIG. 3 is a graph showing the relationship between engine load and required fuel injection amount.

FIG. 3 shows the relationship between engine load and required fuel injection amount Qr. The required fuel injection amount Qr has a predetermined dispersion with respect to the central value due to production error, etc. Within idling range, the required fuel injection fuel amount Qr for engine load L is very small and disperses translationally in the direction of ordinate in FIG. 3. Also, when the load is larger than the idling load, the required fuel injection amount Qr for engine load L is large and disperses in proportion to L.

Since the required fuel injection amount Qr is small and hardly affected by L during idling period periods when engine load L is less than predetermined value $L_1$, the first learning term A in formula (3) according to this invention is fixed and the second learning term B is corrected in response to the feedback signal from the air-fuel ratio sensor 24. When the air-fuel ratio sensor 24 generates lean signals, B is increased by a predetermined amount b to increase the final fuel injection amount TAU. That is, B+b is made new B. Also, when the air-fuel ratio sensor 24 generates overrich signals, B is decreased by the predetermined amount b to decrease the final fuel injection amount TAU. That is, B−b is made new B. The fixation of A and the computation of TAU according to the learning correction of B is sufficient to compensate for variations in TP to reduce undesired changes in the air-fuel ratio and enhance the quality of learning control during the idling period.

When engine load L exceeds the predetermined value $L_1$ the required fuel injection amount Qr is large and the variation of TP from a median is related to a factor proportional to L.

Therefore the second learning term B in formula (3) according to this invention is fixed and the first learning term A is corrected in response to feedback signals from the air-fuel ratio sensor 24. When the air-fuel ratio sensor 24 generates lean signals A is increased by a predetermined amount a to increase the final fuel injection amount TAU. That is, A+a is made new A. Also, when the air-fuel ratio sensor 24 generates overrich signals, A is decreased by the predetermined amount a to decrease the final fuel injection amount TAU. That is, A−a is made new A. Since the change of the basic fuel injection amount TP follows satisfactorily the change of the required fuel injection amount, effectiveness of learning control is improved as a result of learning correction of the first learning term A to increase the effect of learning control when engine load is larger than the predetermined value $L_1$.

Further, the central value of A is 1.0 and the central value of B is 0.

Figure 4:
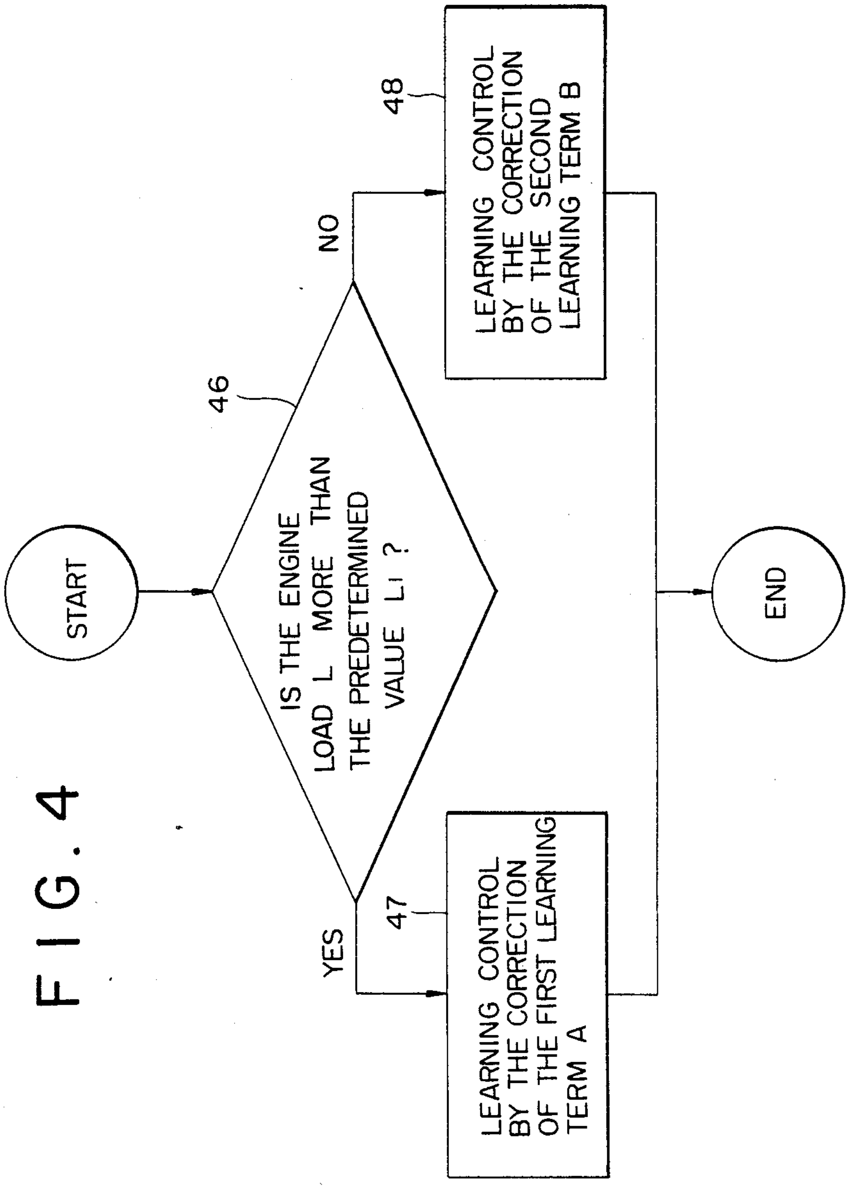
FIG. 4 is a flow chart of a program embodying the present invention.

FIG. 4 is a flow chart of a program embodying this invention. In step 46, whether or not the engine load L is larger than the predetermined value $L_1$ is judged and the program proceeds to step 47 if it is judged yes and to step 48 if not. While the engine load can be detected from ratio Qa/R of intake air flow rate Qa to rotational speed R of engine, intake air flow, intake pipe pressure and the opening of throttle valve respectively vary with the engine load so that these detected amounts in step 46 can be judged instead of the engine load L. Then, cases that the intake air flow is larger than the predetermined value, that the intake pipe pressure is larger than the predetermined value and that the opening of throttle valve is larger than the predetermined value correspond respectively to the case that the engine load L is larger than the predetermined value $L_1$. In step 47, the learning is controlled by the correction of the first learning term A. In step 48, the learning is controlled by the correction of the second learning term B.

What is claimed is:

1. A system for learning control of the air-fuel ratio in an electronically controlled engine comprising:
   means for generating an indication of engine load;
   means for generating a ratio signal indicative of air-fuel ratio by monitoring exhaust gases of said engine; and
   processing means for: (1) determining a basic fuel injection amount, TP, as a predetermined function of engine load, (2) determining a final fuel injection amount, TAU, in accordance with TAU=AxTP+B+J wherein A is a first learning term, B is a second learning term and J is a correction amount, (3) correcting said first learning term A in response to said ratio signal when said engine has a load larger than a predetermined value, and (4) correcting said second learning term B in response to said ratio signal when said engine has a load smaller than said predetermined value.

2. A learning control system as defined in claim 1, wherein said load indication generating means includes means for detecting intake pipe pressure, a predetermined intake pipe pressure being said predetermined value.

3. A learning control system as defined in claim 1, wherein said load indication generating means includes means for detecting intake air flow rate, a predetermined intake air flow rate being said predetermined value.

4. A learning control system as defined in claim 1, wherein said load indication generating means includes means for detecting the opening of a throttle valve, a predetermined opening of the throttle valve being said predetermined value.

5. A learning control system as defined in claim 1, 3, 4 or 2 further comprising means for detecting engine running conditions other than load, said correction amount J being a function of said engine running conditions other than load.

6. A learning control system as defined in claim 5, wherein said engine condition detecting means includes means for detecting at least one of engine temperature and intake air temperature.

7. A system for learning control of the air-fuel ratio in an electronically controlled engine comprising:

means for generating an indication of engine load;

means for generating a ratio signal indicative of air-fuel ratio by monitoring exhaust gases of said engine; and processing means for: (1) determining a basic fuel injection amount, TP, as a predetermined function of engine load, (2) determining a final fuel injection amount, TAU, in accordance with $TAU = A \times TP + B + J$ wherein A is a first learning term, B is a second learning term and J is a correction amount, (3) correcting said first learning term A by a predetermined amount in each of a series of predetermined periods in response to said ratio signal, said correcting function (3) occurring only when said engine has a load larger than a predetermined value, and (4) correcting said second learning term B by a predetermined amount in each of a series of predetermined periods in response to said ratio signal, said correcting function (4) occurring only when said engine has a load smaller than said predetermined value.

* * * * *